(12) United States Patent
Sundholm

(10) Patent No.: US 7,143,776 B2
(45) Date of Patent: Dec. 5, 2006

(54) VALVE ELEMENT

(75) Inventor: Göran Sundholm, Tuusula (FI)

(73) Assignee: Marioff Corporation Oy, Vantaa (FI)

( * ) Notice: Subject to any disclaimer, the term of this patent is extended or adjusted under 35 U.S.C. 154(b) by 172 days.

(21) Appl. No.: 10/507,441

(22) PCT Filed: Apr. 10, 2003

(86) PCT No.: PCT/FI03/00269

§ 371 (c)(1),
(2), (4) Date: Sep. 13, 2004

(87) PCT Pub. No.: WO03/089065

PCT Pub. Date: Oct. 30, 2003

(65) Prior Publication Data

US 2005/0103379 A1    May 19, 2005

(30) Foreign Application Priority Data

Apr. 19, 2002    (FI)    .................. 20020758

(51) Int. Cl.
*F16K 17/40* (2006.01)
*A62C 35/68* (2006.01)

(52) U.S. Cl. ............... 137/68.3; 137/68.22; 137/68.13; 169/11

(58) Field of Classification Search ............. 137/68.13, 137/68.22, 68.3; 222/5; 169/28, 11
See application file for complete search history.

(56) References Cited

U.S. PATENT DOCUMENTS

| 1,781,027 | A | * | 11/1930 | Mapes | 137/68.22 |
| 1,781,854 | A | * | 11/1930 | Mapes | 222/5 |
| 1,921,411 | A | * | 8/1933 | Johann | 137/68.3 |
| 2,072,577 | A | * | 3/1937 | Allen | 222/5 |
| 2,393,985 | A | * | 2/1946 | Grant, Jr. et al. | 222/5 |
| 2,972,998 | A | * | 2/1961 | Detwiler | 137/68.13 |
| 3,633,596 | A | * | 1/1972 | Gerber | 137/68.3 |
| 3,827,449 | A | * | 8/1974 | Gurizzan et al. | 137/68.22 |
| 4,006,780 | A | | 2/1977 | Zehr | |
| 4,609,005 | A | * | 9/1986 | Upchurch | 137/68.22 |
| 4,805,802 | A | * | 2/1989 | MacKendrick et al. | 222/5 |
| 5,845,669 | A | | 12/1998 | Ross | |
| 6,089,403 | A | * | 7/2000 | Mackal | 222/5 |
| 6,131,599 | A | | 10/2000 | DeGood et al. | |

FOREIGN PATENT DOCUMENTS

DE    2635076 A1    2/1978

\* cited by examiner

*Primary Examiner*—John Rivell
(74) *Attorney, Agent, or Firm*—Ladas & Parry LLP

(57) ABSTRACT

Valve element (10), comprising a main body, at least one inlet (101) and at least one outlet (102), a passage connecting the inlet and outlet, at least one burst disk (rupture disk) (13) or equivalent, which, when unbroken, closes the passage from inlet to outlet, and a piston element (15) provided with a piercing element (14) or the like for piercing the burst disk. The piston element (15) is provided with a passage (17) for a pressure medium, said passage extending axially through the piston element from one first side to one second side, that the piston element is provided with a second burst disk or equivalent which, when unbroken, closes the passage (17) provided in the piston element.

14 Claims, 1 Drawing Sheet

VALVE ELEMENT

BACKGROUND OF THE INVENTION

The present invention relates to a valve element as defined in the preamble of claim 1, comprising a main body, at least one inlet and at least one outlet, a passage connecting the inlet and outlet, at least one burst disk (rupture disk) or equivalent, which, when unbroken, closes the passage from the inlet to the outlet, and piston element comprising a piercing element or the like for piercing the burst disk.

A device corresponding to the subject of the invention is known from specification DE 2635076 A. One of the drawbacks of this solution is that the piercing element is returned by the action of pressure back to its original position, so a piece of the burst disk that may have been detached from it by the piercing action may partially block the passage and thus form an obstacle to the flow of pressure medium. In addition, the piercing element has to go completely through the burst disk in order to produce a hole of the desired size in the disk. If the piercing movement is for some reason incompletely executed, it will not produce a hole of the desired size.

The object of the present invention is to achieve a completely new type of solution that makes it possible to avoid the drawbacks of prior-art devices. The object of the invention is to create a reliable apparatus that can be utilized especially in fire extinguishing applications.

The apparatus of the invention is characterized in that the piston element is provided with a passage for a pressure medium, said passage extending axially through the piston element from one first side to one second side, that the piston element is provided with a second burst disk or equivalent, which, while unbroken, closes the passage provided in the piston element.

The apparatus of the invention is additionally characterized by what is stated in claims 2–7.

The solution of the invention has numerous significant advantages. The passage through the piston ensures that, after the second burst disk provided in the piston element has been pierced, the piston will be effectively pressed towards the first burst disk. The solution of the invention is leak-proof and reliable. By using a smaller second burst disk, it is possible to avoid the use of large actuators requiring a great power for the triggering action. By using an intermediate piece, such as a ball, reliable piercing of the second burst disk is achieved and additionally a situation is avoided where the piston of the actuator remains in contact with the second burst disk and no sufficient hole is produced in the burst disk. By employing two-stage triggering of the valve element, such that, during the first stage, the piercing of the second burst disk produces a flow of pressure medium into the cylindrical chamber, thereby causing the piston-piercer combination to move vigorously towards the first burst disk and pierce it, reliable operation of the valve element is achieved, ensuring that the passage from inlet to outlet is reliably opened. The valve element of the invention is thus excellently suited for use in fire extinguishing systems.

BRIEF DESCRIPTION OF THE FIGURES

In the following, the invention will be described in detail by the aid of an example with reference to the attached drawing, wherein.

DETAILED DESCRIPTION OF THE INVENTION

Figure 1:
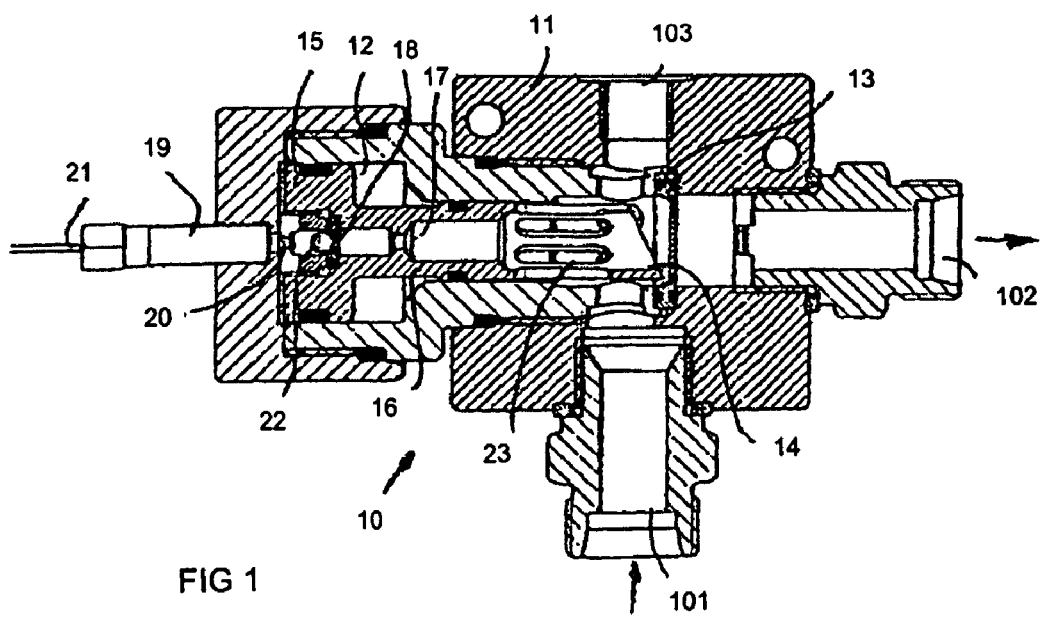
FIG. 1 presents a valve element according to the invention.

FIG. 1 presents a valve element according to the invention in standby state. The device comprises a main body 11, which is provided with an inlet 101 connectable to a pressure source and an outlet 102 connectable to an outbound line. Provided between the inlet and the outlet is a burst disk 13 (rupture disk) which, when unbroken, closes the passage from the inlet 101 to the outlet 102. The device also comprises means for piercing the burst disk 13. These means consist of a cylinder-piston combination in which the piston 15 comprises a piercing element 14 formed on it, preferably on the piston rod 16 part. The piston 15 has been arranged to be movable within a cylinder space 12 between a fist position, where the piercing element 14 formed on the piston rod 16 is on the inlet side in relation to the burst disk 13, and a second position, where the piercing element extends at least partially to the outlet side in relation to the burst disk 13.

The piston is provided with at least one bore 17 extending through the piston 15, preferably from the piercing element 14 to the opposite side of the piston 15. Arranged in the piston element is a second burst disk 18 (rupture disk) which in the unbroken condition closes the passage from the inlet through the bore 17 into the cylinder space 12 on the piston side. The pressure prevailing in the inlet is typically the pressure of the pressure medium, which in the standby state is present in the valve up to the second burst disk.

Figure 2:
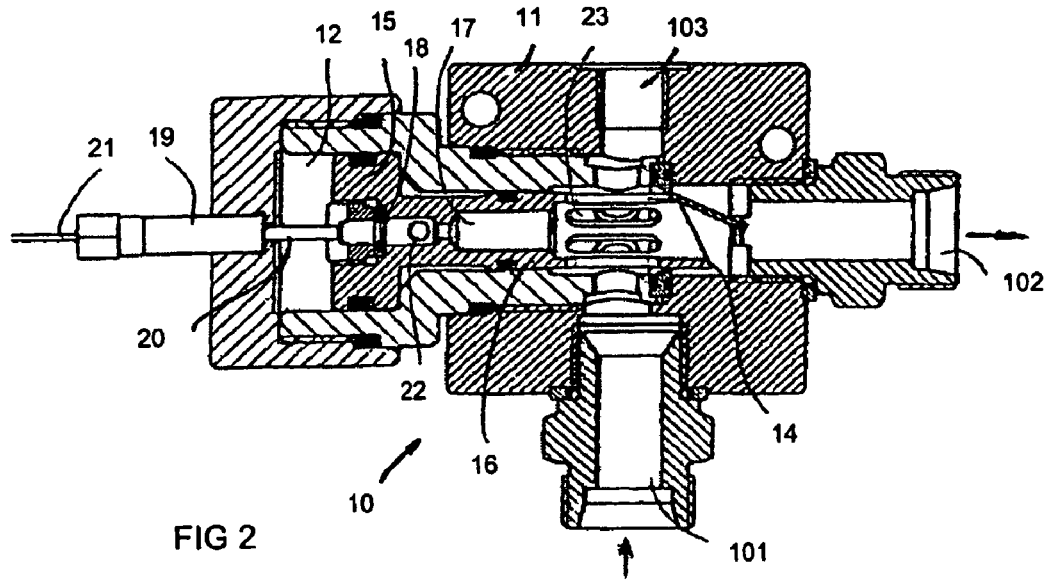
FIG. 2 presents a valve element according to the invention in a triggered state.

Formed at or near the tip of the piercing element is at least one aperture 23 extending into the bore 17, thus forming a part of the passage for the pressure medium after the burst disk 13 has been pierced. Further, the device comprises actuating means for actuating the piston-piercer combination. The embodiment illustrated in the figure is provided with both a manual actuating element and an automatic actuating element 19. The actuating element is designed for remote control, whereby the valve element is to be triggered by means of a control signal. The control signal is supplied via transmission means 21, such as conductors, typically from a control system. The control signal causes the piston of the actuating element to move towards piston 15 and the second burst disk 18. Placed between the piston 15 and the second burst disk is an intermediate piece 22, such as a ball element, which pierces the second burst disk 18 when the actuating element is triggered. Upon triggering, the piston of the actuating element hits the ball and, in consequence of the impulse thus produced, the ball pierces the second burst disk 18. The actuating element 19 is preferably pyrotechnical device in which a control current detonates an explosive charge in the actuating element, thus causing the piston of the actuating element to be vigorously thrust out. The actuating element can be connected to a control system, so the device can be used e.g. in connection with fire extinguishing equipment so that the impulse triggering the actuating element 19 is received from fire detectors and/or smoke detectors (not shown). After the second burst disk has been pierced in consequence of the triggering of the actuating element, the pressure medium is admitted through the bore 17 in the piston and through the hole formed in the burst disk 18 into the cylinder space 12, causing the piston to move towards the first burst disk 13 (to the right in the embodiment illustrated in the figures) and pierce the first burst disk 13 (FIG. 2), with the result that the pressure medium can flow from the inlet 101 to the outlet 102. Through holes formed in the piston element, preferably in its piston rod, the pressure medium can enter into the bore in the piston is rod and further to the outlet 102.

In the embodiment presented in the figure, the valve element 10 also comprises a second outlet 103 especially for venting purposes. This second outlet can be provided with e.g. a valve element (not shown) or a plugging.

Thus, the valve element 10 is preferably a triggering valve in a pressure medium system.

In the above-described embodiments, the piston rod 16 of the piston element is sealedly fitted against the wall of the cylinder space, so that the pressure medium can typically only flow via the passage 17 provided through the piston.

The burst disk is preferably designed to withstand high pressures and pressure differences. The active pressures are typically over 30 bar, preferably over 70 bar. The pressures may even be as high as 300 bar. The burst disk preferably comprises a thinner part in the area to which the action of the piercing element is applied in the triggering situation.

Valve elements according to the invention can be applied especially in connection with fire extinguishing systems, especially in connection with a fire extinguishing apparatus using high-pressure water mist. The pressure medium may consist of gas, liquid or a mixture of gas and liquid.

It is obvious to the person skilled in the art that the invention is not limited to the embodiments described above, but that it may be varied within the scope of the claims presented below.

The invention claimed is:

1. Valve element (10), comprising a main body, at least one inlet (101) and at least one outlet (102), a passage connecting the inlet and outlet, at least one burst disk (rupture disk) (13) or equivalent, which, when unbroken, closes the passage from inlet to outlet, and a piston element (15) provided with a piercing element (14) for piercing the burst disk, characterized in that the piston element (15) is provided with a passage (17) for a pressure medium, said passage extending axially through the piston element from one first side to one second side, that the piston element is provided with a second burst disk or equivalent which, when unbroken, closes the passage (17) provided in the piston element, and that the device comprises means (19, 22) for piercing the second burst disk (18).

2. Valve element according to claim 1, characterized in that the piercing element (14) is provided with at least one aperture (23) extending from the outer surface of the piston element to the passage (17) leading through the piston element.

3. Valve element according to claim 1, characterized in that the means for piercing the second burst disk comprise an actuating element (19), preferably a pyrotechnical triggering device, whose piston (20), when triggering occurs, effects the piercing of the second burst disk (18) either directly or via an intermediate piece (22).

4. Valve element according to claim 3, characterized in that the intermediate piece is a ball (22).

5. Valve element according to claim 1, characterized in that the second burst disk (8), when unbroken, closes a connection from the inlet (101) to a cylinder (12), at least to the piston (15) side of the cylinder.

6. Valve element according to claim 1, characterized in that a piston rod (16) of the piston element is sealedly fitted against a wall of a cylinder.

7. Valve element according to 2, characterized in that the means for piercing the second burst disk comprise an actuating element (19), preferably a pyrotechnical triggering device, whose piston (20), when triggering occurs, effects the piercing of the second burst disk (18) either directly or via an intermediate piece (22).

8. Valve element according to claim 2, characterized in that the second burst disk (8), when unbroken, closes a connection from the inlet (101) to a cylinder (12), at least to the piston element (15) side of the cylinder.

9. Valve element according to claim 3, characterized in that the second burst disk (8), when unbroken, closes a connection from the inlet (101) to a cylinder (12), at least to the piston element (15) side of the cylinder.

10. Valve element according to claim 4, characterized in that the second burst disk (8), when unbroken, closes a connection from the inlet (101) to a cylinder (12), at least to the piston element (15) side of the cylinder.

11. Valve element according to claim 2, characterized in that a piston rod (16) of the piston element is sealedly fitted against a wall of a cylinder.

12. Valve element according to claim 3, characterized in that a piston rod (16) of the piston element is sealedly fitted against a wall of a cylinder.

13. Valve element according to claim 4, characterized in that a piston rod (16) of the piston element is sealedly fitted against a wall of the cylinder.

14. Valve element according to claim 5, characterized in that a piston rod (16) of the piston element is sealedly fitted against a wall of the cylinder.

* * * * *